United States Patent [19]

Ingensand et al.

[11] Patent Number: 5,233,357
[45] Date of Patent: Aug. 3, 1993

[54] SURVEYING SYSTEM INCLUDING AN ELECTRO-OPTIC TOTAL STATION AND A PORTABLE RECEIVING APPARATUS COMPRISING A SATELLITE POSITION-MEASURING SYSTEM

[75] Inventors: Hilmar Ingensand; Erwin Frei, both of Widnau; René Scherrer, St. Gallen, all of Switzerland

[73] Assignee: Wild Leitz AG, Heerbrugg, Switzerland

[21] Appl. No.: 795,279

[22] PCT Filed: Jun. 20, 1989

[86] PCT No.: PCT/EP89/00691
§ 371 Date: Mar. 6, 1990
§ 102(e) Date: Mar. 6, 1990

[87] PCT Pub. No.: WO90/00719
PCT Pub. Date: Jan. 25, 1990

Related U.S. Application Data

[63] Continuation of Ser. No. 460,945, Mar. 6, 1990, abandoned.

[30] Foreign Application Priority Data

Jul. 6, 1988 [CH] Switzerland .................. 02570/88

[51] Int. Cl.⁵ .................................................. G01C 15/00
[52] U.S. Cl. ................................. 342/352; 342/58; 342/357; 364/443; 367/19
[58] Field of Search ............... 33/295, 1 H, 1 T; 342/357, 352, 58

[56] References Cited

U.S. PATENT DOCUMENTS

| | | | |
|---|---|---|---|
| 4,615,617 | 10/1986 | Frank et al. | 342/174 |
| 4,620,788 | 1/1986 | Giger | 356/5 |
| 4,686,474 | 8/1987 | Olsen et al. | 324/331 |
| 4,741,245 | 5/1988 | Malone | 89/41.03 |
| 4,743,913 | 5/1988 | Takai | 342/457 |

FOREIGN PATENT DOCUMENTS 9000718 1/1990 World Int. Prop. O.
9000719 1/1990 World Int. Prop. O.

*Primary Examiner*—Nelson Moskowitz
*Attorney, Agent, or Firm*—Foley & Lardner

[57] ABSTRACT

A terrestrial surveying system comprising an electro-optic total station (1) for combined measurement of angle and distance and a connection to data storage (11) or data processing devices (20), the total station (1) and at least one portable position-measuring unit, which is separated spatially from the total station and equipped with a receiver (3) for a satellite position-measuring system, are connected to one another through a wireless data transfer device (12, 13). The data processing device is preferably set up for determining coordinates, for coordinate transformation from the satellite position-measuring system to the terrestrial coordinate system of the total station and for consistency checking of the data determined.

8 Claims, 2 Drawing Sheets

SURVEYING SYSTEM INCLUDING AN ELECTRO-OPTIC TOTAL STATION AND A PORTABLE RECEIVING APPARATUS COMPRISING A SATELLITE POSITION-MEASURING SYSTEM

This application is a continuation of application Ser. No. 07/460,945, filed Mar. 6, 1990, now abandoned.

BACKGROUND OF THE INVENTION

The invention concerns a terrestrial surveying system comprising an electro-optic total station for combined measurement of angle and distance and a data transfer interface at the total station which is coupled to data storage and data processing devices, A total station is also termed an electronic tachymeter. The angular measurement relates both to horizontal angles and also to vertical angles.

Satellite position-measuring systems enable three-dimensional differential position finding with geodetic accuracy A precondition is the use of a fixed receiving apparatus, tuned to the system, and one or more mobile sets. It is a characteristic feature of such systems that position finding can be undertaken in relatively short time intervals, e.g., in a few seconds, whereby it is also possible to rapidly determine changes in position. (The "KPGPS" method is the kinematic differential positioning with global positioning system method.)

The receiver used in this process is directly equipped with an antenna whose position can be determined with the aid of the system. Because of the quasi-optic propagation characteristics of the waveband chosen for the transmission system, usable reception of the satellite signals is ensured only if the receiving antenna lies directly in the footprint of the satellites. In the case of mobile receivers, the reception can be interrupted temporarily or permanently, especially by topographical obstacles, plant cover, buildings, etc., whereby errors in measurement can result, or a measurement can be rendered impossible.

SUMMARY OF THE INVENTION

It is an object of this invention to make it possible to survey, with the aid of a satellite system, points which do not always or do not certainly lie directly in the footprint of the satellite system. Furthermore, the redundancy of the measurement data determined is increased, so that reliable measurement results, e.g., for official surveying, are obtained.

This object is achieved according to the invention with the features defined by Patent Claim 1.

With the aid of the measurements defined, it also becomes possible to determine by means of an exceptionally flexible use of the system components, the coordinates of such points as would otherwise have been impossible , or only unreliably capable of being surveyed with the use of satellite position-measuring systems. In this process, the reliability of the measurement results is substantially increased by the possibility of use in conjunction with conventional surveying methods. On the other hand, the incorporation of characteristic features of the satellite position-measuring system leads to higher accuracies for the measurement results derived.

BRIEF DESCRIPTION OF THE DRAWINGS

Details of the invention are explained in more detail below with reference to illustrative embodiments with the aid of the drawings, wherein in schematic representation.

DETAILED DESCRIPTION OF THE PREFERRED EMBODIMENTS

Figure 1:
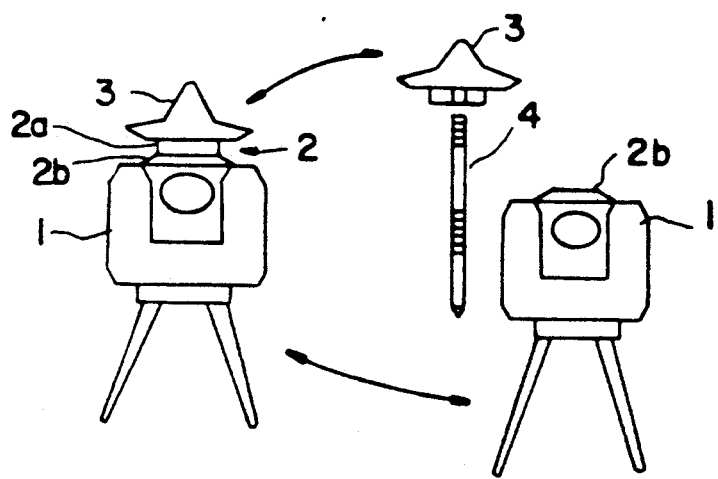
FIG. 1 shows an example of a surveying set, consisting of a total station and an attachable satellite receiver for a satellite position-measuring system.

FIG. 1 shows a total station 1 for the combined measurement of angle and distance, which is provided with a positive centering unit 2 for attaching a satellite position-measuring receiver 3. The positive centering unit 2 has an upper portion 2a attached to the satellite position-measuring receiver 3 and a lower portion 2b attached to the total station 1. The receiver 3, which is set for the satellite position-measuring system, is provided with an appropriate antenna. For example, the receiver is designed to receive signals of a global positioning system (GPS).

Figure 2:
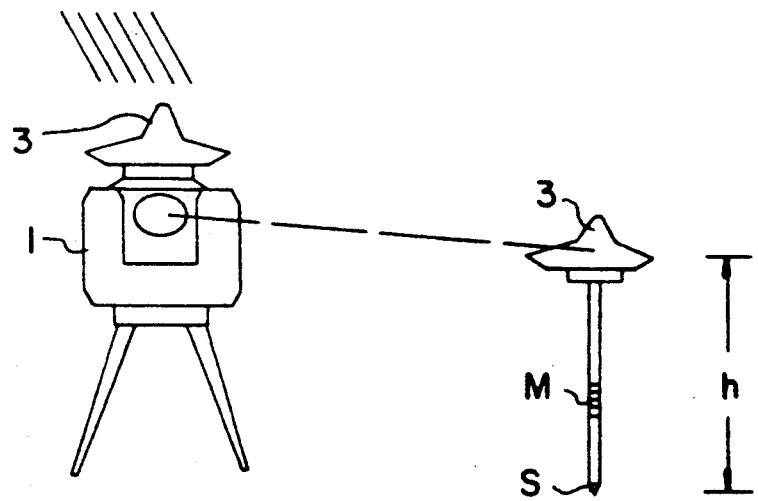
FIG. 2 shows the use of a total station with a mounted satellite receiver to find its own position, and a further portable satellite receiving apparatus.

With mounted receiver 3, the position of the total station can be determined with the aid of the satellite system. As is indicated by appropriate arrows in FIG. 1, the receiver module 3 can also be detached from the total station 1, and mounted on a plumb rod 4. The receiver 3 can then, on the other hand, be used in conjunction with the plumb rod 4 for autonomous position finding via the satellite system; on the other hand, the position of the plumb rod 4 can be surveyed conventionally from the total station 1, as is shown in FIG. 2.

Figure 4:
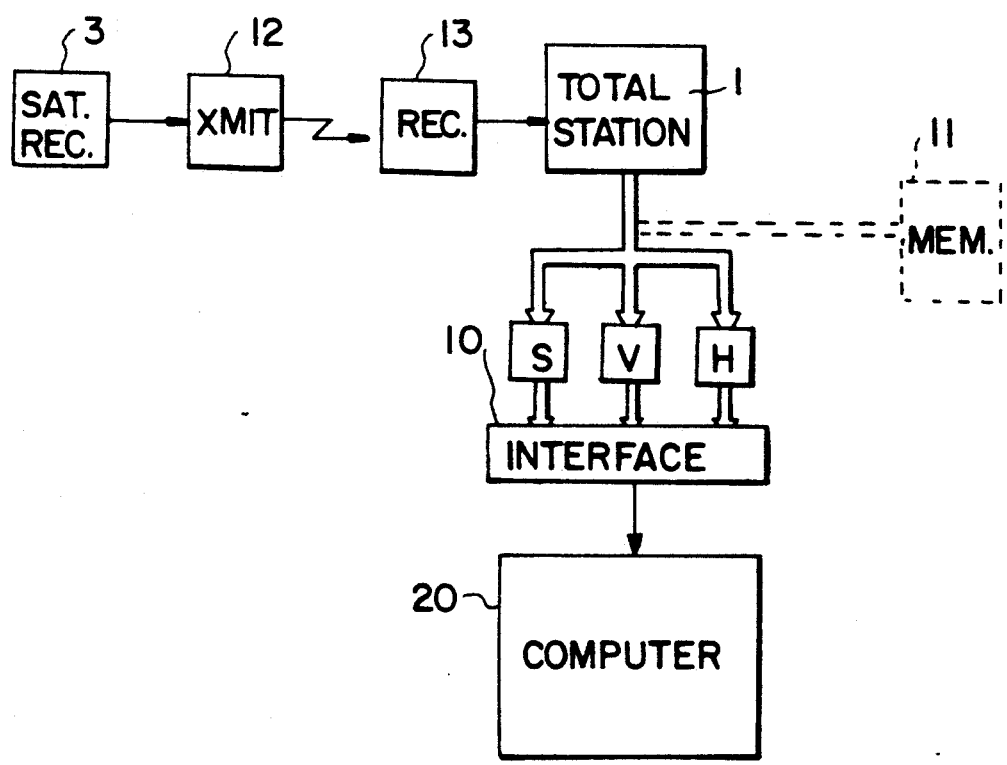
FIG. 4 shows a block diagram of data circuits in the surveying system.

If the autonomous mode of operation with satellite measurements is chosen for the receiver 3 on the plumb rod 4, a wireless data device 1213 according to FIG. 4 functions to couple data from the receiver 3 to the total station 1. Its function is explained elsewhere, together with the explanation of the data circuits.

The plumb rod 4 is, e.g., telescopically extendable. At its lower end it has a conventional plumb rod tip S. Finally, it is provided with measuring device M, which permits determination of the distance h between the plumb rod tip S and the center of the antenna according to FIG. 2.

Figure 3:
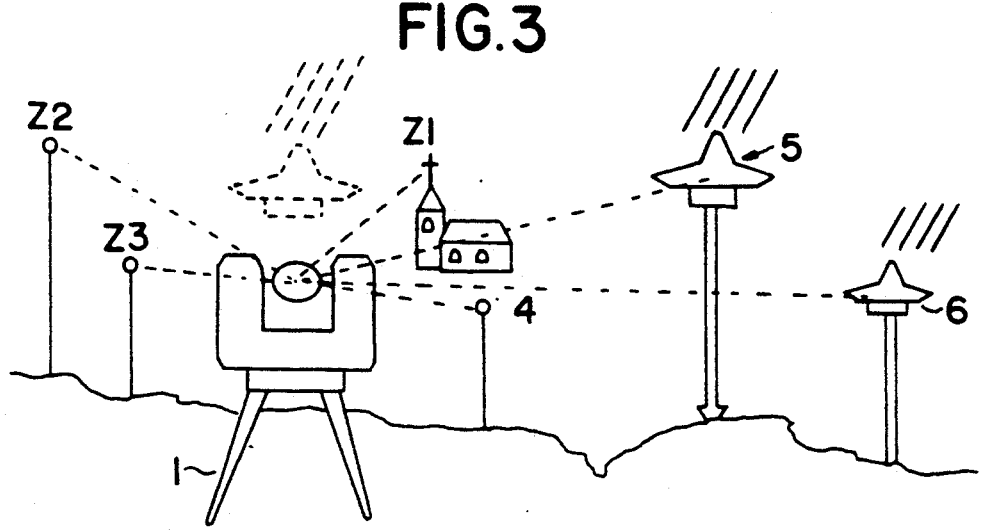
FIG. 3 shows an example of geodesy with a total station, without a satellite receiver, and additionally two mobile satellite receiving apparatuses, giving autonomous position finding and data transfer information to a central data capture station.

In parallel with, or supplementary to position finding with the aid of the satellite position-measuring system, it is also possible for the particular position of the total station 1 to be determined in the terrestrial coordinate system with conventional measuring methods, such as, e.g., free stationing. As an example, FIG. 3 shows the use of a total station 1 together with two complete satellite receiving apparatuses 5 and 6 in the kinematic differential mode of operation. Assuming that the position of the total station 1 has been either measured by mounting a satellite receiver, or computed by resectioning from the positions of the two satellite receiving apparatuses 5 and 6, the aiming points Z1, Z2, Z3 and Z4 can be determined by conventional surveying methods from the position of the total station 1. The accuracy of the conventional positions of the aiming points as determined conventionally on the basis of reference positions from the satellite position-measuring system is substantially improved, in this connection, by comparison with measurement results obtained conventionally. It is possible by means of multiple measurements or combination measurements to significantly increase the redundancy of the measurement results, and thus the reliability of the measurements.

A coordinate transformation is required in order to compare the coordinates from the satellite system with those of conventional terrestrial measurement, e.g., from land topography. This transformation is undertaken in a computer 20 according to FIG. 4, which, via a data interface 10 is either directly connected to the total station 1 or is arranged at a central data capture point, the measurement data being temporarily stored in a memory 11 at the location of the total station. Values S for the measured horizontal distance, and values V for the vertical direction and the horizontal direction H are transferred from the total station.

In this way, it becomes possible to determine the transformation parameters which uniquely describe the geometrical relationship between the coordinates of the satellite positioning system and the local terrestrial coordinate system.

The combination of a total station with a satellite navigation system further enables a mutual control of the measurements, in that identical points are determined by the two measurement processes. However, total stations and satellite units can also survey detailed points completely independently of one another.

An additional advantage of the described combination of sets exists in the case of faults in the mobile satellite receiver systems when the positions of the antennae can be determined anew with terrestrial measurement methods via the total station 1.

Furthermore, the previously mentioned wireless data system between the receiver 3 of a measuring set and the total station 1 can be seen form FIG. 4. The position data received by the receiver 3 are fed to a transmitter 12 and received at the total station 1 by a receiver 13, and passed on to the memory 11 or to the computer 20. An infrared system, e.g., is suitable as such a data transfer system. Coordinates can be derived in the total station 1 from the received position data. This on-the-spot data processing provides a consistency check of the measured values.

The direct data transfer from a measuring set to a total station contributes substantially to rapid and reliable reception of measured values. These advantages emerge in a particular advantageous fashion if the computer is directly connected to the total station, e.g., in the case of extensive geodetic measurements.

What is claimed is:

1. A terrestrial surveying system, comprising:
   an electro-optic total station for combined measurement of angle and distance;
   a data transmission interface coupled to said total station;
   a data storage device coupled to said interface;
   a data processing device coupled to said interface;
   at least one satellite position measuring system comprising a first portable position measuring unit comprising a receiver for determining position data;
   a wireless data transmission system for coupling said measuring system to said total station to transmit said position data to said total station;
   said total station coupling said position data to said data storage device and/or said data processing device;
   said measuring unit having a first releasable fastening, positive centering device;
   said total station having a second releasable fastening, positive centering device for coordinated fastening to said first centering device;
   said first centering device being selectively fastened to said second centering device for positively connecting said measuring unit to said total station at a first relative geometrical position, when there is a sufficient satellite transmission to said first position for reception by said measuring unit, and being selectively fastened to a plumb rod to place said measuring unit at a second relative geometrical position having a sufficient satellite transmission for reception by said measuring unit, when there is insufficient satellite transmission to said first position for reception by said measuring unit.

2. The surveying system as in claim 1, wherein:
   said data processing device performs coordinate determination of said position data and performs coordinate transformation of said position data from a coordinate system of said measuring system to a different coordinate system of said total station for consistency verification of said position data.

3. The surveying system as claimed in claim 1, further comprising:
   additional portable position measuring units respectively mounted upon additional plumb rods for coordinate determination of additional points which cannot be measured from said first position of said total station and/or for coordinate determination of points by both said first measuring unit and said additional measuring units.

4. A terrestrial surveying system, comprising:
   a satellite position measuring apparatus for determining first position data defining a first position of said apparatus, said apparatus including a transmitter for transmitting said first position data;
   a electro-optic total station for combined measurement of angle and distance to produce second position data defining a second position of said system, said total station including a receiver for receiving said first position data from said transmitter;
   a data processor including a memory coupled to said total station for receiving and processing said first position data and said second position data; and
   means for positively mounting said satellite position measuring apparatus at one of said first position and said second position at which sufficient satellite signal reception exists for accurate operation of said apparatus, said means for positively mounting comprising a first releasable fastening, positive centering device attached to said measuring apparatus and a second releasable fastening, positive centering device attached to said total station.

5. A surveying system as in claim 4, wherein said first position and said second position are effectively identical and said first centering device is attached to said second centering device for attaching said apparatus to said total station at said first position.

6. A surveying system as in claim 4, wherein said first position and said second position are effectively different and said first centering device is attached to a plumb rod at said second position.

7. A surveying system as in claim 4, wherein said data processor transforms a coordinate system of position data received so that said first position data and said second position data are available in an effectively single coordinate system.

8. A surveying system as in claim 4, further comprising:
a plurality of additional satellite position measuring apparatuses having respective separate first releasable fastening, positive centering devices attached thereto for coordinate determination of respective separate position data for respective separate positions.

* * * * *